United States Patent [19]

Kaminaga

[11] Patent Number: 5,187,617
[45] Date of Patent: Feb. 16, 1993

[54] APPARATUS FOR REPRODUCING DIGITAL VIDEO SIGNAL

[75] Inventor: Kozo Kaminaga, Kanagawa, Japan

[73] Assignee: Sony Corporation, Tokyo, Japan

[21] Appl. No.: 865,803

[22] Filed: Mar. 25, 1992

Related U.S. Application Data

[63] Continuation of Ser. No. 297,394, Jan. 17, 1989, abandoned.

[30] Foreign Application Priority Data

Jan. 22, 1988 [JP] Japan .................................. 63-10738

[51] Int. Cl.⁵ ........................ G11B 15/14; G11B 5/55; G11B 21/02
[52] U.S. Cl. ..................................... 360/64; 360/38.1; 360/78.02; 360/77.16; 358/314
[58] Field of Search ................... 360/32, 38.1, 75, 64, 360/77.13, 77.14, 77.15, 77.16, 9.1, 84, 10.2, 78.02; 358/314, 336

[56] References Cited

U.S. PATENT DOCUMENTS

| | | | |
|---|---|---|---|
| 4,531,162 | 7/1985 | Tokumitsu | 360/10.3 |
| 4,800,447 | 1/1989 | Toba | 360/10.3 |
| 4,825,311 | 4/1989 | Saito | 360/10.2 |
| 4,916,555 | 4/1990 | Hathaway et al. | 360/77.16 |
| 4,935,827 | 6/1990 | Oldershaw et al. | 360/10.2 |
| 5,003,406 | 3/1991 | Hatanaka et al. | 360/10.2 |

FOREIGN PATENT DOCUMENTS 0160539 6/1985 European Pat. Off. .
0177231 4/1986 European Pat. Off. .
2121229A 12/1983 United Kingdom .

OTHER PUBLICATIONS

Patent Abstracts of Japan 61247181, Satoru, Nov. 4, 1986.

Primary Examiner—Andrew L. Sniezek
Attorney, Agent, or Firm—Hill, Steadman & Simpson

[57] ABSTRACT

A digital video signal reproducing apparatus adapted for reproduction of a magnetic tape where video data of one field are recorded on a plurality of tracks by a plurality of rotary heads. Playback heads employed for such reproduction are mounted on bimorph bases or the like so that the vertical positions or heights of the playback heads are controllable and, if any of the playback heads is rendered faulty by some reason, the vertical positions thereof are controlled to select the order of the tracks from which the video data are to be reproduced, whereby required correction can be carried out with interfield concealment of the reproduced video data to consequently avert deterioration of the image quality.

10 Claims, 6 Drawing Sheets

ODD FIELD

EVEN FIELD

FIG.5A

1st FIELD

| #1o | A B |
| #2o | C D |
| #3o | A B |
| #4o | C D |

FIG.5B

2nd FIELD

| #1e | C D |
| #2e | A B |
| #3e | C D |
| #4e | A B |

FIG.5C

3rd FIELD

| #1o | A B |
| #2o | C D |
| #3o | A B |
| #4o | C D |

APPARATUS FOR REPRODUCING DIGITAL VIDEO SIGNAL

This is a continuation of application Ser. No. 297,394, filed Jan. 17, 1989, now abandoned.

BACKGROUND OF THE INVENTION

1. Field of the Invention

The present invention relates to a digital video signal reproducing apparatus and, more particularly, to an apparatus adapted for reproduction of a magnetic tape where digitized video signals are recorded by means of rotary magnetic heads.

2. Description of the Prior Art

In an apparatus of a type which digitally records and reproduces a video signal, there exists an advantage that substantially no deterioration is caused with regard to the image quality in an operation of editing or dubbing a tape. However, due to a high density in recording video data on a magnetic tape, it becomes difficult to record video data of one field on a single slant track.

For the purpose of eliminating such disadvantage, an improvement has been developed for practical use wherein video data of one field are recorded on a plurality of slant tracks by a plurality of rotary heads so that one field of the image can be reproduced by playback of the plural slant tracks.

In this case, if one field of the image is divided into an odd number of sectors and such field sectors are sequentially associated with an even number of playback heads, the heads corresponding to the same pixels on the image come to be different per field, so that even when one of the playback heads is rendered faulty, the non-reproduced pixel data in one field can be replaced with the pixel data in the next field. However, in case one field of the image is divided into an even number of sectors by reason of the data rate, there may arise a problem that the playback heads corresponding to the same pixels remain the same in the entire fields. As a result, if one of the heads is caused to be faulty, there is a possibility that the non-reproduced pixel data cannot be concealed.

OBJECTS AND SUMMARY OF THE INVENTION

It is therefore an object of the present invention to provide a digital video signal reproducing apparatus which is capable of eliminating the conventional drawbacks observed in the prior art.

Particularly the principal object of the present invention resides in providing an improved digital video signal reproducing apparatus which can perform concealment of the data despite occurrence of any fault such as a clog in the playback head, or dropout.

According to one aspect of the present invention, there is provided an apparatus for reproducing digital video signals recorded on a tape in such a manner that digital video signals constituting each field of image information are divided into a plurality of sectors each being recorded on mutually different tracks. The apparatus comprises a rotary head drum having two or more displaceable reproducing heads spaced apart by a predetermined angle for reproducing the recorded digital video signals from the tracks, means for supplying a control signal to the reproducing heads so as to change the vertical positions or heights thereof for every field, and memory means for storing the reproduced digital video signals and outputting the same in a correct sequence.

BRIEF DESCRIPTION OF THE DRAWINGS

FIGS. 5A through 5C schematically illustrate the correlationship between the video data of each field and the playback heads in the reproduction state shown in FIGS. 4A through, 4C;

DETAILED DESCRIPTION OF THE PREFERRED EMBODIMENTS

Hereinafter a video tape recorder (VTR) applying the digital video signal reproducing apparatus of the present invention will be described with reference to the accompanying drawings.

Figure 1:
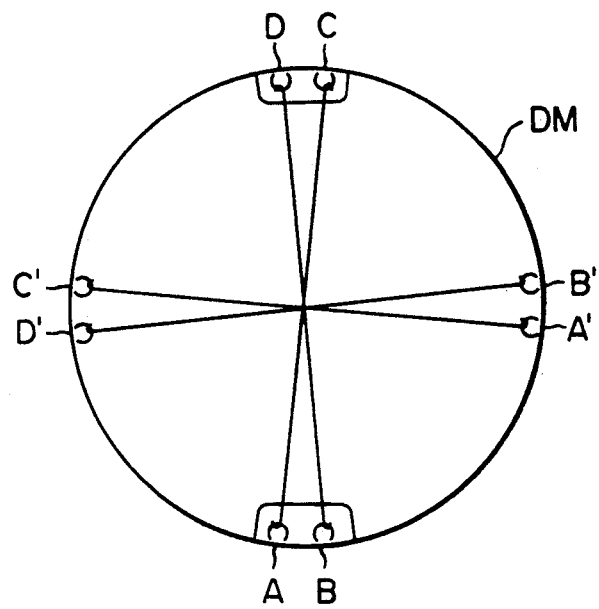
FIG. 1 schematically illustrates an exemplary rotary head drum employed in the digital signal reproducing apparatus of the present invention.

FIG. 1 shows an exemplary rotary head drum DM employed in the VTR according to the present invention, wherein the drum DM is equipped with a pair of sets of playback heads A·B and C·D at opposed positions spaced apart with an angular interval of 180°.

The playback heads A·B and C·D have mutually different azimuths and are so disposed as to have an adequate positional difference in the vertical direction of the rotary drum.

There are also provided a pair of sets of recording heads A'·B' and C'·D' similarly at opposed positions spaced apart with an angular interval of 180°.

The playback heads A·B and C·D are mounted on displaceable type head bases of which vertical positions are controllable by the use of bimorph elements or the like as known well, so that the recording tracks can be exactly traced with tracking control signals supplied thereto. And such tracking control ensures output of high-quality RF signals even in a fast playback mode or slow playback mode.

Figure 2:
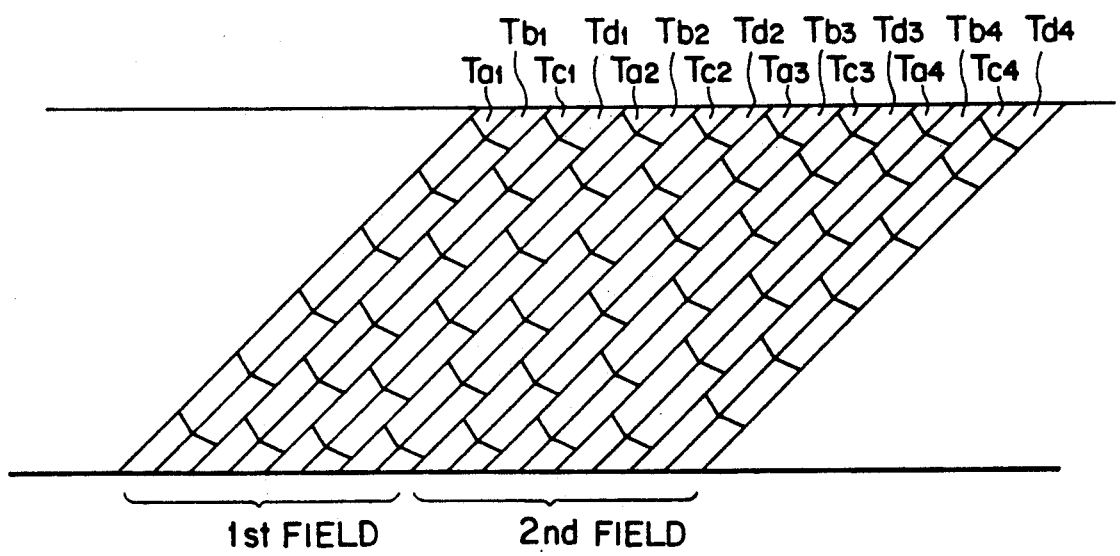
FIG. 2 schematically illustrates a recording pattern on a tape to be reproduced by an exemplary embodiment of the digital signal reproducing apparatus according to the present invention.

If the rotary drum DM is so set as to rotate at a frequency of 100 Hz and a predetermined tape speed is selected, the video data obtained at a rate of 50 fields/sec can be recorded with a track pattern shown in FIG. 2.

That is, the video data of one field are recorded on eight tracks $Ta_1$, $Tb_1$, $Tc_1$, $Td_1$, $Ta_2$, $Tb_2$, $TC_2$, and $Td_2$, and then the video data of the next field are recorded on tracks $Ta_3$, $Tb_3$, $Tc_3$, $Td_3$, $Ta_4$, $Tb_4$, $Tc_4$, and $Td_4$.

Figure 3A:
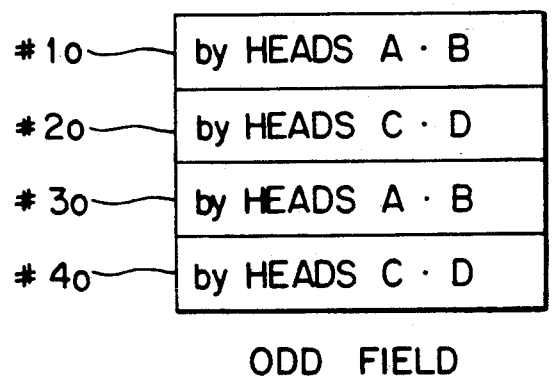
FIGS. 3A and 3B are schematic diagrams for explaining operations performed in the digital signal reproducing apparatus of the invention.
Figure 3B:
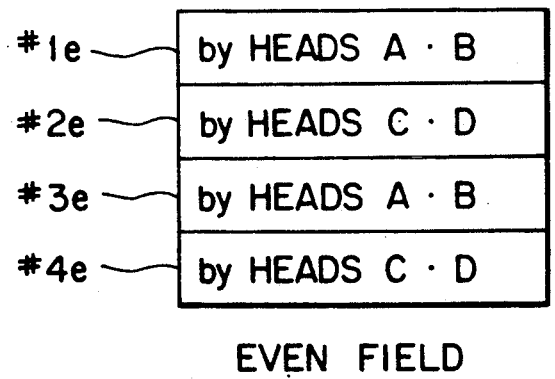

As illustrated in FIGS. 3A and 3B, the first line through the last line in each of the odd fields and even fields are distributed into four sectors $\#1_o$, $\#2_o$, $\#3_o$,

$4_o$ and #$1e$, #$2e$, #$3e$, #$4e$ respectively, and the video data of the individual sectors are recorded while being adequately distributed to form pairs of tracks.

Therefore, when such tracks are reproduced by the playback heads A·B and C·D, the data of the individual sectors #$1_o$, #$2_o$, #$3_o$, #$4_o$ of each odd field are reproduced by the playback heads *A·B, C·D, A·B, C·D* respectively; and also the data of the individual sectors #$1e$, #$2e$, #$3e$, #$4e$ of each even field are reproduced in a similar manner.

In such recording pattern, the positionally coincident sectors, e.g. #$1_o$ and #$1e$ in the mutually adjacent fields are reproduced by the same heads A·B, so that if proper reproduction fails to be performed due to clog or the like in one set of playback heads A·B out of the pair as mentioned previously, the data of the sectors #$1_o$, #$3_o$ and #$1e$, #$3e$ are lost so as to eventually render the error data correction impossible, even with concealment between the fields.

Figure 4A:
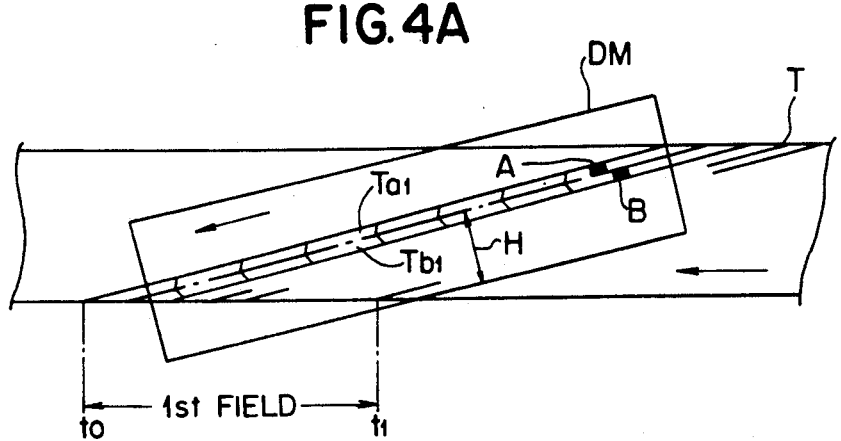
FIGS. 4A through 4C schematically illustrate the relationship between playback heads and tracks to explain the operation in the exemplary embodiment of the invention.
Figure 4B:
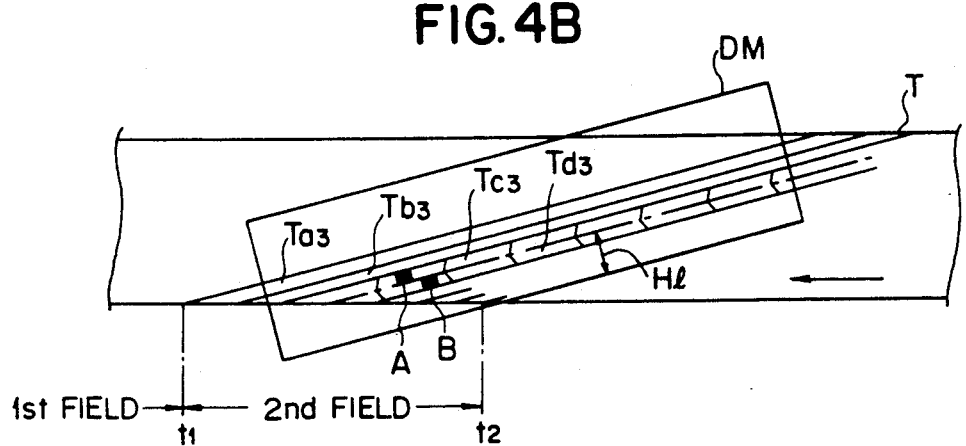

In the present invention, therefore, a control voltage is applied to the bimorph bases where the playback heads A·B and C·D are attached, so as to control the heights of the heads for selection of the tracks to be reproduced. First, as shown in FIG. 4A with regard to the portion of the tape T where video data of the odd or first field are recorded between time $t_0$ and $t_1$, the control voltage is not applied to the bimorph bases of the playback heads A·B or to those of unshown playback heads C·D either. Then the video data are reproduced initially from the tracks $Ta_1$, $Tb_1$ by the playback heads A·B as shown in FIG. 4A, and during the next half rotation, the video data are reproduced from two tracks $Tc_1$, $Td_1$ by the playback heads C·D although not shown. Consequently, eight tracks are reproduced with two rotations of the playback heads, and the data of the sectors #$1_o$, #$2_o$, #$3_o$, #$4_o$ constituting the image of the first field are reproduced as shown in FIG. 5A. And during reproduction of the video data between time t1 and t2 in the next second field, the control voltage is applied to the bimorph bases in such a manner that the vertical positions or heights of the playback heads A·B and C·D are changed in reverse directions to each other.

As a result, the playback heads A·B are displaced to have a height H1 at the first reproducing position in the even or second field so that, instead of the tracks $Ta_3$, $Ta_3$ which should be reproduced at this time in the second field, the tracks $Tc_3$, $Td_3$ anterior thereto by a distance of two tracks come to be reproduced by the playback heads A·B. Therefore, in the second field, the video data of the sector #$2e$ are reproduced by the playback heads A·B as shown in FIG. 5B.

Figure 4C:
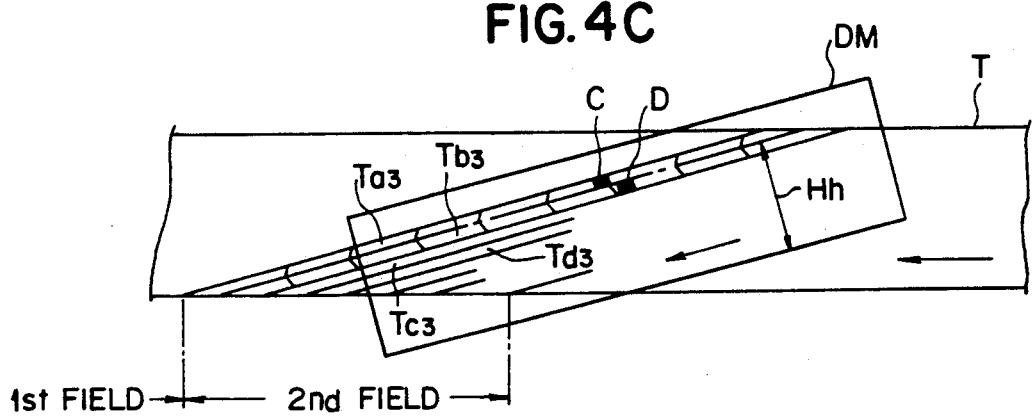

During the next half rotation in the second field, the vertical positions of the playback heads C·D are controlled to a height $H_h$ as shown in FIG. 4C so that, instead of the tracks $Tc_3$, $Td_3$ which should be reproduced by the playback heads C,D, the tracks $Ta_3$, $Tb_3$ posterior thereto by a distance of two tracks come to be reproduced, whereby the video data of the sector #$1e$ are reproduced by the playback heads C·D as shown in FIG. 5B.

Thus, during the time period of the even field, the video data on the tracks to be reproduced originally by the playback heads A·B are outputted from the playback heads C·D, while the video data on the tracks to be reproduced by the playback heads C·D are outputted from the playback heads A·B.

As will be described later, the digital VTR is equipped with a field memory to store at least the processed data of individual blocks for carrying out error detection and correction by an inner code with regard to the reproduced video data to correct the error therein and also for carrying out error detection and correction by an outer code as well as for the processing in a variable speed playback mode. Therefore, even when the sequence of writing the output data is different from the regular one, the video data can be read out as normal reproduced data with remarkable facility if the identification signals for identifying the fields and the tracks are reproduced simultaneously, and the error correction and so forth of the reproduced video data are executed substantially in the same manner as in the conventional signal processing circuit of the playback unit.

Accordingly, the playback heads for reproducing the video data of the individual sectors can be changed in the adjacent fields Ly switching the control voltage, which is applied to the bimorph bases, per field corresponding to the two rotations of the drum, as shown in FIGS. 5A through 5C.

Consequently, even when one set of playback heads C·D out of the pair become faulty as mentioned previously, it is still possible to obtain a satisfactory image substantially without any deterioration of the image quality by executing interfield concealment with the video data in the positionally coincident sectors of the adjacent fields.

Figure 6:
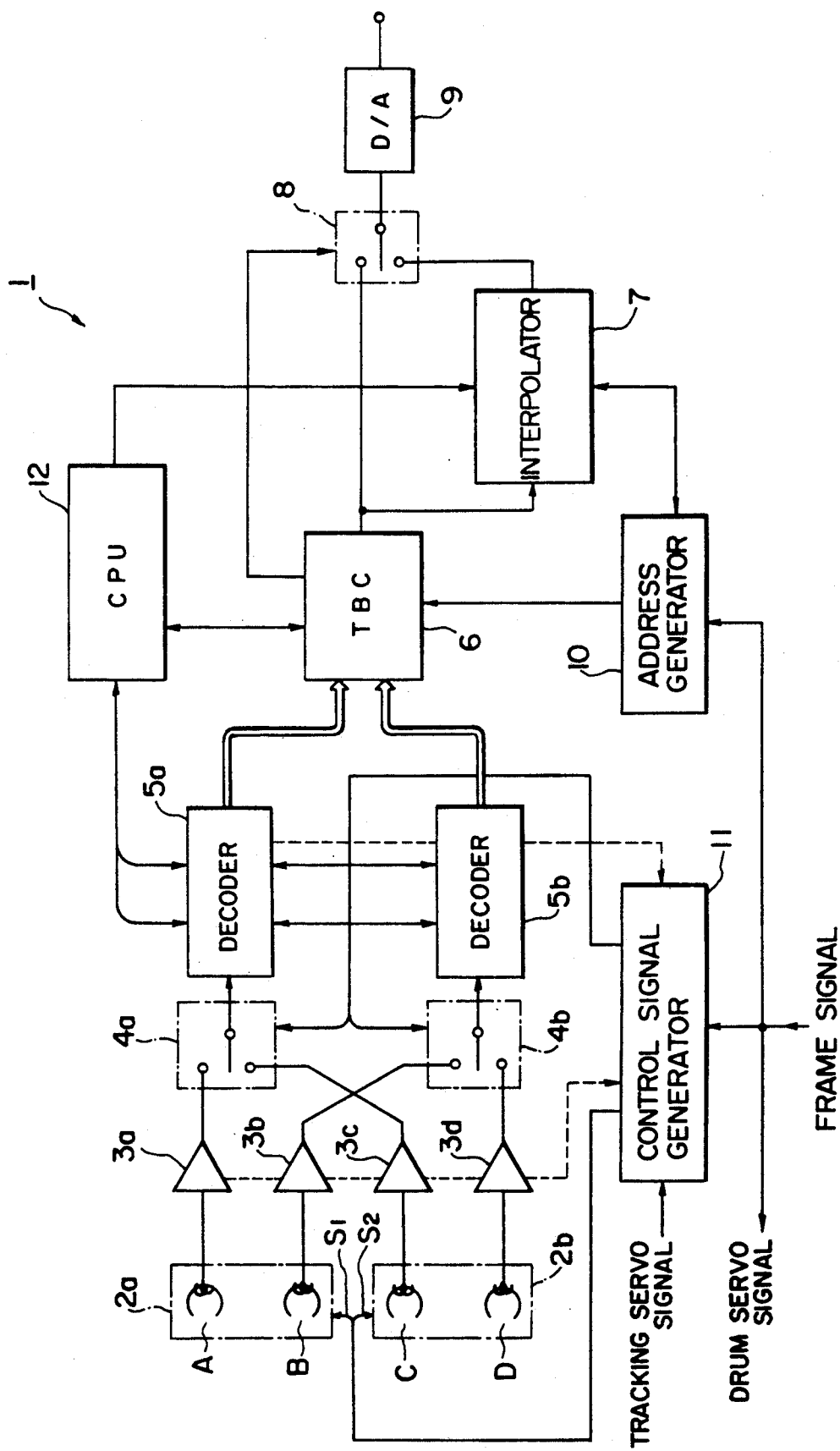
FIG. 6 is a block diagram of an exemplary signal processing circuit in the digital signal reproducing apparatus of the invention.

FIG. 6 is a block diagram of an exemplary signal processing circuit applicable to the digital video signal reproducing apparatus of the present invention, in which a pair of opposed playback head sets $2a$, $2b$ are attached to the aforementioned rotary drum DM, and first-stage reproduced signal amplifiers $3a$, $3b$, $3c$, and $3d$ connected to the playback head sets $2a$, $2b$ are further connected via head switches $4a$, $4b$ to decoders $5a$, $5b$ which convert the reproduced signals into digital codes and provide output video data after error data detection and correction.

The decoders $5a$, $5b$ are connected to an interpolator 7 via a time base corrector (TBC) 6. The interpolator 7 serves to control the output timing of the reproduced video data and also executes timing control of the chroma signal. The interpolator 7 is connected via a switch 8 to a D/A converter 9.

An address generator 10 is connected to both the TBC 6 and the interpolator 7 so as to supply thereto a write address, a read address and a clock signal. Further shown is a control signal generator 11 which supplies a control signal to the playback head sets $2a$, $2b$ for controlling the heights of the playback heads A·B and C·D and also supplies a switching signal to the switches $4a$, $4b$. Such control signals are outputted in accordance with a frame signal, a tracking servo signal and so forth. And the above-described circuits are controlled by a CPU 2 furnished with a signal processing program therein.

Now a description will be given with regard to the operation of the signal processing circuit 1. The reproduced digital signals from the playback heads A·B and C·D in the pair of head sets $2a$ and $2b$ are supplied to the switches $4a$ and $4b$ via the playback amplifiers $3a$, $3b$, $3c$, and $3d$ respectively.

The control signal generator 11 is supplied with a frame signal formed on the basis of the reproduced signals and, when the playback heads A·B are scanning the tracks, the switches 4a, 4b are connected to the playback amplifiers 3a, 3b respectively, so that the reproduced digital signals from the playback heads A·B are supplied to the decoders 5a, 5b respectively. Meanwhile, when the playback heads C·D are scanning the tracks, the switches 4a, 4b are connected to the playback amplifiers 3c, 3d respectively, so that the reproduced digital signals from the playback heads C·D are supplied to the decoders 5a, 5b respectively.

Figure 7:
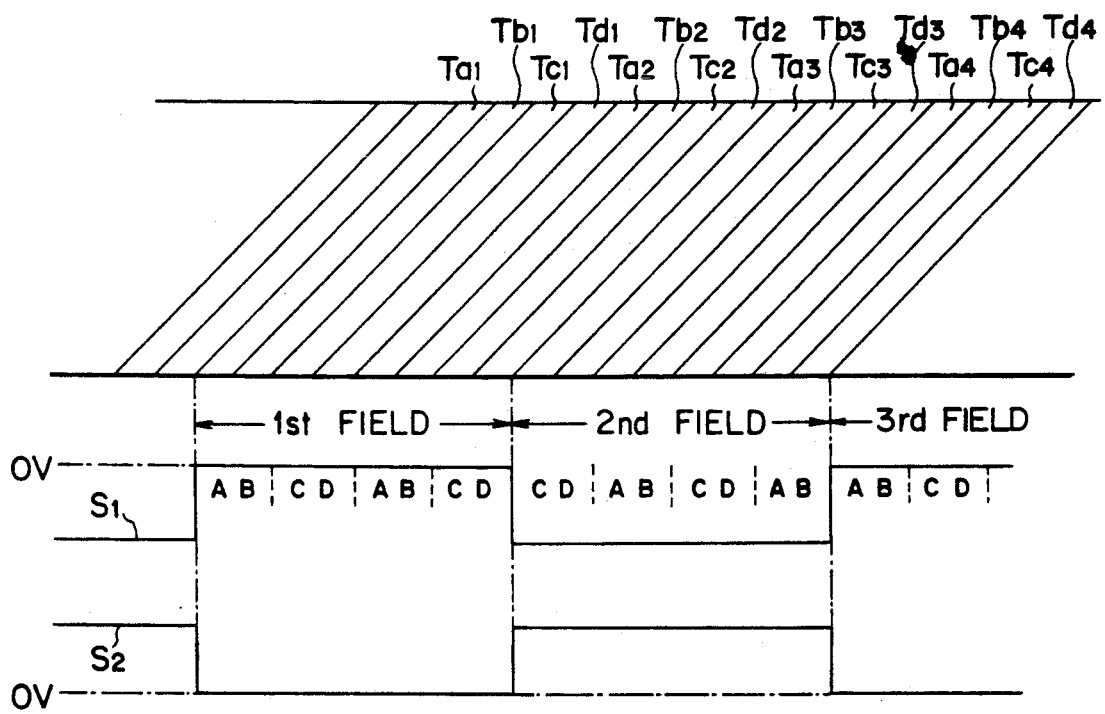
FIG. 7 is a timing chart representing the relationship between head-height position control signals and tracks in the signal processing circuit of FIG. 6.

The control signal generator 11 is further supplied with a tracking servo signal so as to achieve proper tracking of the playback head sets 2a and 2b under control. Besides the above, for the purpose of controlling the heights of the heads on the basis of the frame signal in accordance with an odd or even field, head-height position control signals S1, S2 inverted per period of each field as shown in FIG. 7 are supplied to the bimorph bases of the playback head sets 2a, 2b. Each of the control signals S1, S2 may be such that the tracking servo signal is superimposed thereon.

The decoders 5a, 5b demodulate the reproduced digital signals modulated previously by a predetermined method, and detect block sync signals from the digital data thus demodulated. Identification signals added to each block for identifying its field, track and block numbers are detected from the block. The decoders 5a, 5b further perform, with regard to each block, data error detection and correction of data by the use of an inner code, and thereafter perform, with regard to each sector astride a plurality of blocks, data error detection and correction of data by the use of an outer code.

The data thus corrected are written in the TBC 6 together with an error flag which represents the result of such correction. However, in case there exists any error, an error flag alone may be written. The data written in the TBC 6 can be discriminated in regard to the field number, track number, block number and sample number thereof from the identification signals obtained from the reproduced video signals, so that the addresses to be written in the TBC 6 are fed from the decoders 5a, 5b on the basis of the information thus obtained. The two fields. And even when the playback heads scan other tracks different from those corresponding thereto originally, the data are written, in conformity with the write addresses generated on the basis of the identification signals, at proper address positions in the memory without depending on the playback heads, and the data are so rearranged as to form a normal image. The data rearranged and time base corrected by the TBC 6 are read out in conformity with the read addresses obtained from the address generator 10, and then are supplied via the switch 8 to the D/A converter 9 where the data are converted into analog video signals.

The interpolator 7 is equipped with a field memory to store the output data of the TBC 6 based on the write addresses from the address generator 10. In a modification, the write addresses may be fed from the TBC 6.

When any erroneous data is read out from the TBC 6, an error flag concomitant therewith is read out and fed to the switch 8, so that the data posterior by a distance of one field is supplied from the interpolator 7 to the D/A converter 9 after the chroma processing is carried out under control of the CPU 12, thereby executing the desired interpolation.

The circuit configuration may be so modified that, as indicated by a dotted line in FIG. 6, a clog of the playback heads A·B or C·D is detected in accordance with the level of the error flag outputted from one of the decoders 5a, 5b or in accordance with the output level of the first-stage amplifiers 3a through 3d, and the head-height control signals S1, S2 are outputted from the control signal generator 11 in response merely to the detection signal that represents failure of reproduction of the normal video data.

Although the above embodiment has been explained with regard to an exemplary case where the video data of each field are divided into four sectors and recorded on eight tracks, the number of such sectors is not limited to four alone, and the recording pattern may be so modified that video data forming one image field can be reproduced from four tracks.

It is also to be understood that, in the digital video data reproducing apparatus of the present invention, the number of opposed heads is not limited to two or four alone, and a modified type with rotary heads disposed at equal angular intervals may also be employed to reproduce video data dispersed in a plurality of tracks.

Furthermore, the present invention is applicable also to another case where the video data of an image divided into an odd number of sectors are recorded on an odd number of tracks.

According to the digital video signal reproducing apparatus of the present invention, as mentioned hereinabove, the vertical positions or heights of playback heads are controllable in each of the fields so that, in reproduction of a tape where video data are recorded while one image field is divided into a plurality of sectors, the data concerned with the sector positions of the reproduced image in the adjacent field are outputted from different ones of the two or more opposed playback heads. Therefore, upon occurrence of any fault such as clog or the like in one set of the playback heads out of the pair, the video data can be interpolated due to the correlation between the fields, whereby a remarkably advantageous effect is attainable in averting deterioration of the image quality despite such a fault.

Although various minor changes and modifications might be proposed by those skilled in the art, it will be understood that I wish to include within the claims of the patent warranted hereon all such changes and modifications as reasonably come within my contribution to the art.

What is claimed is:

1. An apparatus for reproducing digital video signals recorded on a tape in such a manner that digital video signals constituting each field of image information are divided into a plurality of sectors each being recorded on mutually different tracks, said apparatus comprising:
   a rotary head drum means having at least two displaceable reproducing heads spaced apart by a predetermined angle for reproducing the recorded digital video signals of the plurality of sectors from said tracks;
   means for supplying a control signal to said reproducing heads so as to reverse vertical position of the reproducing heads for each field such that a first sector of the field being scanned by one of the heads and a second sector of the field being scanned by the other head in one field are scanned in the directly following field such that the first sector is then scanned by the other head and the second sector is then scanned by the one head; and
   memory means for storing the reproduced digital video signals, and means for outputting from the memory means the reproduced digital video signals in a correct sequence.

2. An apparatus according to claim 1, wherein said rotary head drum is equipped with the reproducing heads spaced apart by an angle of 180 degrees from each other.

3. An apparatus according to claim 1, wherein said rotary head drum is equipped with one set of displaceable reproducing heads spaced apart from another set of reproducing heads.

4. An apparatus according to claim 1, wherein said control signal is supplied to said reproducing heads when a state of the reproduced digital video signal is deteriorated.

5. An apparatus according to claim 1 wherein when switching from an even field to an odd field a vertical position of the two heads is reversed such that one of the heads moves up and the other head moves down.

6. An apparatus according to claim 1 wherein vertical positions of two of the heads are reversed a sufficient distance such that in their new positions, sectors in the previous field which were reproduced by the one head are reproduced by the other head in the next field.

7. An apparatus according to claim 1 wherein the heads reverse vertical positions between fields such that even if one of the heads becomes faulty a satisfactory image without substantial deterioration of image quality is provided by inter-field concealment by use of video data being played by the head which is not faulty.

8. An apparatus for reproducing video signals recorded on a tape and wherein the video signals for each field or image information are divided into sectors, comprising
a rotary head drum means having at least two vertically displaceable reproducing heads spaced apart by a predetermined angle for reproducing the recorded video signals from the fields divided into sectors; and
means for supplying a control signal to each of said reproducing head so as to reverse vertical positions of the reproducing heads for each field such that a first sector of the field being scanned by one of the heads and a second sector of the field being scanned by the other head in one field are scanned in the directly following field such that the first sector is then scanned by the other head and the second sector is then scanned by the one head.

9. An apparatus according to claim 8 wherein first and second sets of two heads each is provided with the heads in each set being positioned adjacent to one another, and with the sets being displaced from one another by approximately 18020 , and wherein said means for supplying a control voltage causes the first set of heads to move in an opposite vertical direction relative to the second set of heads for each field.

10. An apparatus according to claim 8 wherein means are provided for outputting video signals from the first and second head in a correct sequence.

* * * * *